United States Patent
Lehmann et al.

(10) Patent No.: US 6,521,032 B1
(45) Date of Patent: Feb. 18, 2003

(54) MAGENTA INKS COMPRISING COPPER COMPLEX AZO DYES BASED ON 1-NAPHTHOL-DI- OR TRI-SULFONIC ACIDS

(75) Inventors: Urs Lehmann, Basel (CH); Marcel Frick, Reinach (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 111 days.

(21) Appl. No.: 09/669,464

(22) Filed: Sep. 25, 2000

(30) Foreign Application Priority Data

Sep. 27, 1999 (CH) .............................................. 1761/99
Jan. 10, 2000 (CH) .................................................. 41/00

(51) Int. Cl.⁷ ........................ C09D 11/00; C09B 45/18; B32B 3/00; B32B 27/14

(52) U.S. Cl. ................................ 106/31.51; 106/31.84; 534/693; 534/701; 534/713; 534/720; 534/724; 8/641; 8/682; 8/685; 428/195

(58) Field of Search ........................... 106/31.51, 31.48; 534/693, 720, 724, 713, 701; 8/641, 682, 685; 428/195

(56) References Cited

U.S. PATENT DOCUMENTS

| | | | |
|---|---|---|---|
| 5,102,459 A | | 4/1992 | Ritter et al. ............. 106/31.51 |
| 5,356,440 A | * | 10/1994 | Galafassi et al. ........... 534/593 |
| 5,717,078 A | | 2/1998 | Tzikas et al. ................ 534/634 |
| 5,750,662 A | | 5/1998 | Reichert et al. ............ 534/612 |
| 6,063,137 A | | 5/2000 | Scheibli et al. ................. 8/549 |
| 2002/0011179 A1 | * | 1/2002 | Menzel et al. ........... 106/31.51 |
| 2002/0017218 A1 | * | 2/2002 | Baettig et al. ........... 106/31.51 |

FOREIGN PATENT DOCUMENTS

| | | |
|---|---|---|
| EP | 0 246 763 | 11/1987 |
| EP | 0 366 121 | 5/1990 |
| EP | 0 247 729 | 1/1992 |
| JP | 63-218766 | 9/1988 |
| WO | 96/24636 | 8/1996 |
| WO | 99/29782 | 6/1999 |
| WO | 99/31182 | 6/1999 |

OTHER PUBLICATIONS

Derw. Abst.No. 88–297404/42 of JP 63–218766, Sep. 1988.
W. Bauer et al., Magenta Dyes, American Ink Maker Oct, 1998 pp. 53–56.

* cited by examiner

Primary Examiner—Helene Klemanski
(74) Attorney, Agent, or Firm—Kevin T. Mansfield

(57) ABSTRACT

Inks comprising a dye of formula (1)

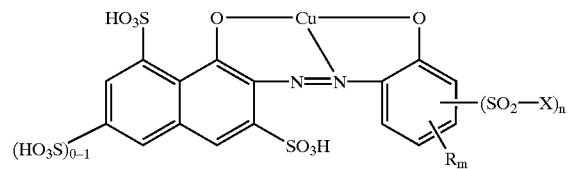

(1)

wherein

X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom;

or X has the same definitions as Z with the exception of a group removable under alkaline conditions;

R is $C_1$–$C_4$alkyl, $C_1$–$C_4$alkoxy or halogen; and m and n are each independently of the other the number 0, 1 or 2; and an organic solvent, yield magenta prints and dyeings having good fastness to light and a high colour brilliance.

17 Claims, No Drawings

MAGENTA INKS COMPRISING COPPER COMPLEX AZO DYES BASED ON 1-NAPHTHOL-DI- OR TRI-SULFONIC ACIDS

The present invention relates to inks comprising certain copper complex azo dyes based on 1-naphthol-3,6,8-trisulfonic acid or 1-naphthol-3,8-disulfonic acid as coupling component and to dye mixtures comprising the said dyes. The present invention relates also to the novel copper complex azo dyes contained in the inks or dye mixtures according to the invention.

The inks underlying the present invention are especially suitable for the printing of paper, textile fibre materials, plastics films or aluminium foils, especially using the ink-jet printing method, and yield magenta dyeings and prints having good fastness to light and a high colour brilliance.

The dyes and dye mixtures underlying the present invention are suitable for the preparation of the inks according to the invention and for the dyeing of paper, wood, textile fibre materials and aluminium sheets or foils using traditional dyeing and printing methods and yield magenta dyeings and prints having good fastness to light and a high colour brilliance.

Inks are subject to high demands in terms of their fastness to light and their colour brilliance. The known magenta inks do not fulfil all of those demands at the same time. For example, although the known inks produce recordings having good fastness to light, the colour shades in such cases are dull and have a low degree of brilliance, as, for example, in the case of inks that contain C.I. Reactive Red 23. On the other hand, other known inks yield recordings having a high degree of brilliance but do not provide the desired quality in terms of the fastness to light of the recordings.

The present invention is therefore based on the problem of providing improved inks for the dyeing and printing of paper, textile fibre materials, plastics films or aluminium foils that possess the qualities described above to a high degree. The new inks should produce brilliant colour shades and at the same time be distinguished by good fastness to light.

It has now been found, surprisingly, that inks comprising a copper complex structurally similar to C.I. Reactive Red 23 produce a brilliant, bluish magenta having good fastness to light.

The present invention accordingly relates to inks comprising a dye of formula (1)

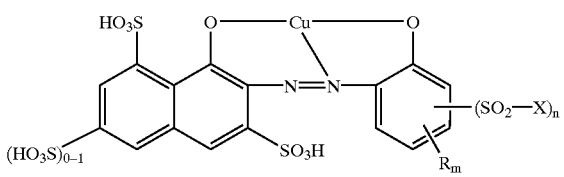

wherein
  X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom;
  or X has the same definitions as Z with the exception of a group removable under alkaline conditions;
  R is $C_1$–$C_4$alkyl, $C_1$–$C_4$alkoxy or halogen; and
  m and n are each independently of the other the number 0, 1 or 2; and
  an organic solvent.

Z as $C_1$–$C_{24}$alkoxy, especially $C_1$–$C_{12}$alkoxy and more especially $C_1$–$C_4$alkoxy is straight-chain or branched and is, for example, methoxy, ethoxy, propoxy, isopropoxy, n-butoxy, sec-butoxy, isobutoxy or tert-butoxy. The mentioned radicals are unsubstituted or substituted in the alkyl moiety, for example by $C_1$–$C_4$alkoxy, e.g. methoxy or ethoxy; hydroxy; sulfo; sulfato or by carboxy. Radicals interrupted in the alkyl moiety by oxygen and unsubstituted or further substituted in the alkyl moiety are, for example, polyalkylene oxides having from 4 to 24 carbon atoms, for example polyethylene oxide of formula —(O—$CH_2$—$CH_2$)$_{2-12}$—OH, polypropylene oxide of formula

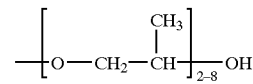

and mixed polyethylene oxide/polypropylene oxide. The hydroxy group of the mentioned polyalkylene oxide radicals may have been etherified, for example by $C_1$–$C_4$alkyl, e.g. methyl or ethyl.

Z as $C_1$–$C_4$alkylthio is, for example, methylthio, ethylthio, propylthio, isopropylthio or n-butyl-thio. The mentioned radicals are unsubstituted or substituted in the alkyl moiety, for example by $C_1$–$C_4$alkoxy, e.g. methoxy or ethoxy; hydroxy; sulfo or by carboxy. Preference is given to the radicals substituted by one or two radicals from the group hydroxy, sulfo and carboxy.

Z as phenoxy or phenylthio can include both the unsubstituted radicals and the radicals substituted in the phenyl ring, for example by $C_1$–$C_4$alkyl, e.g. methyl or ethyl, which is unsubstituted or further substituted, e.g. by carboxy; $C_1$–$C_4$alkoxy, e.g. methoxy or ethoxy; carboxy; $C_2$–$C_4$alkanoylamino, e.g. acetylamino or propionylamino; carbamoyl; N—$C_1$–$C_4$alkyl-carbamoyl, which is unsubstituted or further substituted in the alkyl moiety, e.g. by carboxy, for example N-carboxymethylcarbamoyl; sulfamoyl; N—$C_1$–$C_4$alkylsulfamoyl; sulfo or by halogen, e.g. chlorine or bromine. Preference is given to the substituted radicals, especially the radicals substituted by carboxy, carboxymethyl, N-carboxymethylcarbamoyl or by sulfo, more especially those substituted by carboxy or sulfo.

Z as N-mono- or N,N-di-$C_1$–$C_{24}$alkylamino is, for example, methylamino, ethylamino, N,N-di-methylamino, N,N-diethylamino, isopropylamino, n-butylamino, sec-butylamino, isobutylamino or tert-butylamino, linear or branched pentylamino, hexylamino, heptylamino, octylamino, nonylamino, decylamino, undecylamino, dodecylamino, tridecylamino or tetradecylamino. The mentioned radicals are unsubstituted or substituted in the alkyl moiety, e.g. by phenyl (which may itself be substituted by carboxy, carbamoyl, sulfo or by sulfamoyl); amino; $C_2$–$C_4$alkanoylamino, e.g. acetylamino or propionylamino; $C_1$–$C_4$alkoxy, e.g. methoxy or ethoxy; hydroxy; sulfo; sulfato; carboxy; carbamoyl or by sulfamoyl. The mentioned radicals are uninterrupted or interrupted in the alkyl moiety by oxygen or by —$NR_1$— in which $R_1$ is hydrogen or $C_1$–$C_4$alkyl, e.g. methyl or ethyl, unsubstituted or substituted, for example by amino or by hydroxy, but is preferably hydrogen.

Examples of radicals that are substituted in the alkyl moiety and/or are interrupted in the alkyl moiety by oxygen or by —$NR_1$— include N-β-aminoethylamino, N-β-aminopropylamino, N-β-hydroxyethylamino, N,N-di-β-hydroxyethylamino, N-2-(β-hydroxyethoxy)ethylamino, N-2-[2-(β-hydroxyethoxy)ethoxy]-ethylamino, N-2-(β-hydroxyethylamino)ethylamino, N-2-(β-aminoethylamino)ethylamino, polyethylene imines of formula —(NH—$CH_2$—$CH_2$)$_3$—$NH_2$ or —(NH—$CH_2$—$CH_2$)$_4$—$NH_2$,

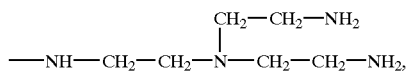

N-β-sulfatoethylamino, N-β-sulfoethylamino, N-carboxymethylamino, N-β-carboxyethylamino, N-α,β-dicarboxyethylamino, N-α,γ-di-carboxypropylamino, N-ethyl-N-β-hydroxyethylamino and N-methyl-N-β-hydroxyethylamino. Suitable unsubstituted and uninterrupted radicals that are branched in the alkyl moiety correspond, for example, to the formula

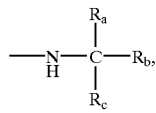

wherein the sum of the carbon atoms $R_a+R_b+R_c$ is from 11 to 14. An example of an amine forming the basis of the radical of the formula given above is ®Primene 81 R (Rohm & Haas).

Z as N-mono- or N,N-di-$C_1$–$C_{24}$alkylamino that is substituted in the alkyl moiety and/or is interrupted in the alkyl moiety by oxygen or by —$NR_1$— in which $R_1$ has the definitions and preferred meanings given above is preferably N-mono- or N,N-di-$C_1$–$C_6$alkylamino and especially N-mono- or N,N-di-$C_1$–$C_4$alkylamino.

Preferred for Z as N-mono- or N,N-di-$C_1$–$C_{24}$alkylamino are the radicals substituted in the alkyl moiety by phenyl, amino, hydroxy, sulfo, sulfato, carboxy or by carbamoyl, especially by phenyl, amino, sulfo, sulfato, carboxy or by carbamoyl, and uninterrupted or interrupted in the alkyl moiety by —NH—.

Z as $C_{10}$–$C_{20}$terpeneamino, preferably $C_{20}$diterpeneamino, is an amino group mono-substituted at the nitrogen atom by a terpene hydrocarbon radical. Examples of terpene hydrocarbon radicals that come into consideration are acyclic, monocyclic or bicyclic $C_{10}$terpenes, acyclic, monocyclic, bicyclic or tricyclic $C_{15}$sesquiterpenes, acyclic, monocyclic or tricyclic $C_{20}$diterpenes, especially tricyclic $C_{20}$diterpenes and more especially dehydrogenated tricyclic $C_{20}$diterpenes, such as those derived from dehydroabietic acid. An example of such a dehydrogenated tricyclic $C_{20}$diterpeneamino radical that may be mentioned is the radical of formula

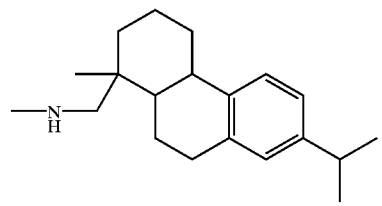

Z as $C_5$–$C_7$cycloalkylamino can include both the unsubstituted radicals and the radicals substituted in the cycloalkyl ring, for example by $C_1$–$C_4$alkyl, e.g. methyl or ethyl, especially methyl, or by carboxy. Such radicals are preferably the corresponding cyclohexyl radicals.

Z as phenylamino or N—$C_1$–$C_4$alkyl-N-phenylamino, preferably phenylamino, can include both the unsubstituted radicals and the radicals substituted in the phenyl ring, for example by $C_1$–$C_4$alkyl, e.g. methyl or ethyl, which is unsubstituted or further substituted, e.g. by carboxy; $C_1$–$C_4$alkoxy, e.g. methoxy or ethoxy; carboxy; carbamoyl; N—$C_1$–$C_4$alkylcarbamoyl, which is unsubstituted or further substituted in the alkyl moiety, e.g. by carboxy, for example N-carboxymethylcarbamoyl; sulfo or by halogen, e.g. chlorine or bromine. Preference is given to the substituted radicals, especially the radicals substituted by carboxy, carboxymethyl, N-carboxymethylcarbamoyl or by sulfo, more especially those substituted by sulfo.

Z as naphthylamino or N—$C_1$–$C_4$alkyl-N-naphthylamino, preferably naphthylamino, can include both the unsubstituted radicals and the radicals substituted in the naphthyl ring, for example by sulfo. Preference is given to the radicals substituted by from 1 to 3, especially 2 or 3, sulfo groups.

Z as piperazin-1-yl unsubstituted or substituted at the nitrogen atom is, for example, a radical of formula

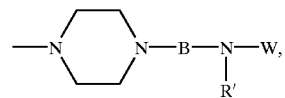

wherein

B is an organic bridge member and

R' is hydrogen or unsubstituted or substituted $C_1$–$C_4$alkyl,

W is hydrogen or a radical of formula —CO—R", R" being unsubstituted or substituted $C_1$–$C_8$alkyl, $C_5$–$C_7$cycloalkyl, phenyl or naphthyl.

Examples of organic bridge members that come into consideration for B are, for example, unsubstituted or substituted $C_1$–$C_{12}$alkylene, which may be interrupted by 1, 2 or 3 members from the group —NH—, —N($CH_3$)— and —O—, and unsubstituted or substituted $C_5$–$C_7$cycloalkylene, phenylene or naphthylene. There comes into consideration as $C_5$–$C_7$cycloalkylene especially cyclohexylene which may be unsubstituted or substituted, for example by $C_1$–$C_4$alkyl, especially by methyl. Examples of substituents that come into consideration for the mentioned phenylene and napthylene radicals are $C_1$–$C_4$alkyl, $C_1$–$C_4$alkoxy, $C_2$–$C_4$alkanoylamino, amino, hydroxy, ureido, halogen, carboxy and sulfo, especially $C_1$–$C_4$alkyl, $C_1$–$C_4$alkoxy, halogen and sulfo. Examples of substituents that come into consideration for the mentioned $C_1$–$C_{12}$-alkylene radicals are hydroxy, sulfo, sulfato, cyano and carboxy. The $C_1$–$C_{12}$alkylene radicals are preferably unsubstituted.

For R' as $C_1$–$C_4$alkyl there come into consideration, for example, methyl, ethyl, propyl, isopropyl, butyl, sec-butyl, tert-butyl and isobutyl. The mentioned alkyl radicals may be unsubstituted or substituted, for example by hydroxy, sulfo, sulfato, cyano or by carboxy. Preferred as alkyl radicals are the corresponding unsubstituted radicals.

For R" as phenyl or naphthyl there come into consideration, in addition to the corresponding unsubstituted radicals, the radicals substituted, for example, by $C_1$–$C_4$alkyl, $C_1$–$C_4$alkoxy, $C_2$–$C_4$alkanoylamino, amino, hydroxy, ureido, halogen, carboxy or by sulfo.

For R" as $C_5$–$C_7$cycloalkyl there comes into consideration especially the cyclohexyl radical. The mentioned cycloalkyl radicals may be unsubstituted or substituted, for example by $C_1$–$C_4$alkyl, especially by methyl.

For R" as $C_1$–$C_8$alkyl there come into consideration especially $C_1$–$C_4$alkyl radicals, e.g. methyl, ethyl, propyl, isopropyl, butyl, sec-butyl, tert-butyl or isobutyl. The alkyl radicals mentioned for R" may be unsubstituted or substituted, for example by hydroxy, sulfo, sulfato, cyano or by carboxy. Preferred for R" are the unsubstituted radicals.

B is preferably a $C_1$–$C_{12}$alkylene radical, especially a $C_1$–$C_{10}$alkylene radical, which may be interrupted by 1, 2 or 3 members from the group —NH—, —N(CH$_3$)— and especially —O— and which is unsubstituted or substituted by hydroxy, sulfo, sulfato, cyano or by carboxy. The corresponding unsubstituted alkylene radicals are of special interest.

B is especially a $C_1$–$C_{10}$alkylene radical, more especially a $C_1$–$C_6$alkylene radical and preferably a $C_1$–$C_4$alkylene radical. Radicals B that are of special interest are those of formulae —CH$_2$—, —CH$_2$CH$_2$— and —CH$_2$CH$_2$CH$_2$—.

R' is preferably hydrogen or $C_1$–$C_4$alkyl unsubstituted or substituted by hydroxy, sulfo, sulfato, cyano or by carboxy, preferably hydrogen or $C_1$–$C_4$alkyl and especially hydrogen.

R" is preferably unsubstituted or $C_1$–$C_4$alkyl-, $C_1$–$C_4$alkoxy- , halo- , carboxy- or sulfo-substituted phenyl or especially $C_1$–$C_8$alkyl. R" is especially $C_1$–$C_4$alkyl, more especially methyl or ethyl and preferably methyl.

W is preferably hydrogen.

There come into consideration as $C_1$–$C_4$alkyl for X and R independently of one another, for example, methyl, ethyl, n- or iso-propyl and n-butyl, sec-butyl, tert-butyl and isobutyl, especially methyl and ethyl.

X as $C_1$–$C_4$alkyl is unsubstituted or substituted by hydroxy and is preferably unsubstituted.

For R as $C_1$–$C_4$alkoxy there come into consideration, for example, methoxy, ethoxy, n-propoxy, isopropoxy, n-butoxy and isobutoxy, preferably methoxy and ethoxy and especially methoxy.

R as halogen is, for example, fluorine, chlorine or bromine, preferably chlorine or bromine and especially chlorine.

As a group Z removable under alkaline conditions there comes into consideration, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$—C$_4$alkyl or —OSO$_2$—N(C$_1$–C$_4$alkyl)$_2$. Z is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H and more especially —OSO$_3$H.

Preference is given to the inks according to the invention wherein

R is $C_1$–$C_4$alkyl or halogen.

Preference is given to the inks according to the invention wherein

Z is —OSO$_3$H; —Cl; $C_1$–$C_{12}$alkoxy unsubstituted or substituted in the alkyl moiety by hydroxy, sulfo or by carboxy, which may further be interrupted in the alkyl moiety by one, two or three oxygen atoms; $C_1$–$C_4$alkylthio unsubstituted or substituted in the alkyl moiety by hydroxy, sulfo or by carboxy; amino; N-mono- or N,N-di-$C_1$–$C_{14}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which may further be interrupted in the alkyl moiety by one, two or three oxygen atoms or —NR$_1$— groups in which R$_1$ is hydrogen or unsubstituted or amino-substituted $C_1$–$C_4$alkyl; $C_{20}$diterpeneamino; $C_5$–$C_7$-cycloalkylamino unsubstituted or substituted by $C_1$–$C_4$alkyl or by carboxy; phenylamino or N—$C_1$–$C_4$alkyl-N-phenylamino unsubstituted or substituted by carboxymethyl, $C_1$–$C_4$alkoxy, carboxy, carbamoyl, N—$C_1$–$C_4$alkylcarbamoyl (which may itself be further substituted in the alkyl moiety by carboxy), sulfo or by halogen; naphthylamino substituted in the aryl moiety by sulfo; morpholino; piperidin-1-yl; or piperazin-1-yl unsubstituted or substituted at the nitrogen atom by 2-aminoethyl or 3-aminopropyl.

Special preference is given to the inks according to the invention wherein

Z is —OSO$_3$H; $C_1$–$C_4$alkylthio unsubstituted or substituted in the alkyl moiety by hydroxy, sulfo or by carboxy; amino; N-mono- or N,N-di-$C_1$–$C_{14}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which may further be interrupted in the alkyl moiety by one, two or three oxygen atoms or —NH— groups; $C_{20}$diterpeneamino; phenylamino or N—$C_1$–$C_4$alkyl-N-phenylamino unsubstituted or substituted by carboxymethyl, $C_1$–$C_4$alkoxy, carboxy, carbamoyl, N—$C_1$–$C_4$alkylcarbamoyl (which may itself be further substituted in the alkyl moiety by carboxy), sulfo or by halogen; naphthylamino substituted in the aryl moiety by sulfo; morpholino; piperidin-1-yl; or piperazin-1-yl unsubstituted or substituted at the nitrogen atom by 2-aminoethyl.

Very special preference is given to the inks according to the invention wherein

Z is —OSO$_3$H; $C_1$–$C_4$alkylthio unsubstituted or substituted in the alkyl moiety by hydroxy, sulfo or by carboxy; amino; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl.

In an especially important embodiment of the inks according to the invention Z is —OSO$_3$H; amino; N-mono- $C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl.

X is hydroxy, unsubstituted or hydroxy-substituted $C_1$–$C_4$alkyl, vinyl or a radical —$CH_2$—$CH_2$—Z, wherein Z has the definitions and preferred meanings given above, or X has the same definitions as given above for Z with the exception of Z in the meaning of a group removable under alkaline conditions.

X is preferably hydroxy, unsubstituted or hydroxy-substituted $C_1$–$C_4$alkyl, vinyl or a radical —$CH_2$—$CH_2$—Z, wherein Z has the definitions and preferred meanings given above, or X is preferably amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_5$–$C_7$cyclo-alkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom; the definitions and preferred meanings given above for Z also applying in corresponding manner to X.

X is especially hydroxy, $C_1$–$C_4$alkyl or a radical —$CH_2$—$CH_2$—Z, wherein Z has the definitions and preferred meanings given above, or X is especially amino; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl.

X is more especially hydroxy or a radical —$CH_2$—$CH_2$—Z, wherein Z is —$OSO_3H$; $C_1$–$C_4$alkylthio unsubstituted or substituted in the alkyl moiety by hydroxy, sulfo or by carboxy; amino; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl; or X is very especially amino; N-mono-$C_1$–$C_4$alkylamino unsubstituted or substituted in the alkyl moiety by phenyl (which may itself be substituted by carboxy), hydroxy, sulfo, sulfato or by carboxy; N,N-di-$C_1$–$C_4$alkylamino unsubstituted or substituted in the alkyl moiety by hydroxy, sulfo or by carboxy; morpholino; or piperazin-1-yl unsubstituted or substituted at the nitrogen atom by 2-aminoethyl.

Especially important meanings of X are hydroxy, amino, methylamino, ethylamino and —$CH_2$—$CH_2$—$OSO_3H$; and especially the radical —$CH_2$—$CH_2$—$OSO_3H$.

In a preferred embodiment of the inks according to the invention m is the number 0 or 1, especially 0, and n is the number 1 or 2, especially 1.

Preference is given to the inks according to the invention wherein X is hydroxy or a radical —$CH_2$—$CH_2$—Z, wherein Z is —$OSO_3H$; $C_1$–$C_4$alkylthio unsubstituted or substituted in the alkyl moiety by hydroxy, sulfo or by carboxy; amino; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl; or X is amino; N-mono-$C_1$–$C_4$alkylamino unsubstituted or substituted in the alkyl moiety by phenyl (which may itself be substituted by carboxy), hydroxy, sulfo, sulfato or by carboxy; N,N-di-$C_1$–$C_4$alkylamino unsubstituted or substituted in the alkyl moiety by hydroxy, sulfo or by carboxy; morpholino; or piperazin-1-yl unsubstituted or substituted at the nitrogen atom by 2-aminoethyl;

R is $C_1$–$C_4$alkyl or halogen;

m is the number 0 or 1 are n is the number 1 or 2.

Special preference is given to the inks according to the invention wherein the dye of formula (1) is a dye of formula (2)

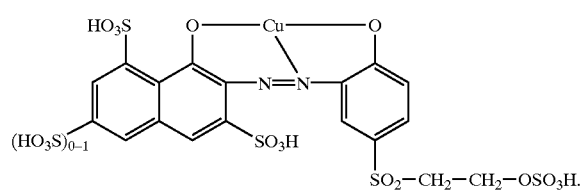

(2)

The dyes used in the inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example, by membrane separation procedures, such as ultrafiltration, reverse osmosis or dialysis. The inks preferably have a total content of dyes of from 0.5 to 35% by weight, especially from 1 to 30% by weight and preferably from 1 to 20% by weight, based on the total weight of the ink. As a lower limit, a limit of 1.5% by weight, preferably 2% by weight and especially 3% by weight, is preferred.

The inks may comprise organic solvents, for example water-miscible organic solvents, e.g. $C_1$–$C_4$alcohols, such as methanol, ethanol, n-propanol, isopropanol, n-butanol, sec-butanol, tert-butanol and isobutanol; amides, e.g. dimethylformamide and dimethylacetamide, ketones or ketone alcohols, e.g. acetone, methyl isobutyl ketone, diacetone alcohol; ethers, e.g. tetrahydrofuran and dioxane; nitrogen-containing heterocyclic compounds, e.g. N-methyl-2-pyrrolidone and 1,3-dimethyl-2-imidazolidone; polyalkylene glycols, e.g. polyethylene glycol or polypropylene glycol; $C_2$–$C_6$alkylene glycols and thioglycols, e.g. ethylene glycol, propylene glycol, butylene glycol, 1,5-pentanediol, thiodiglycol, hexylene glycol, diethylene glycol, triethylene glycol, tetraethylene glycol and diethylene glycol monobutyl ether; further polyols, e.g. glycerol, and 1,2,6-hexanetriol; and $C_1$–$C_4$alkyl ethers of polyhydric alcohols, e.g. 2-methoxyethanol, 1-methoxypropanol, 2-(2-methoxyethoxy)ethanol, 2-(2-ethoxyethoxy)-ethanol, 2-[2-(2-methoxyethoxy)ethoxy]-ethanol and 2-[2-(2-ethoxyethoxy)-ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

The inks may also comprise solubilisers, e.g. ε-caprolactam.

The inks may comprise thickeners of natural or synthetic origin inter alia for the purpose of adjusting the viscosity.

Examples of thickeners that may be mentioned are commercially available alginate thickeners, starch ethers or locust bean flour ethers, especially sodium alginate on its own or in admixture with modified cellulose, e.g. methylcellulose, ethylcellulose, carboxymethycellulose, hydroxyethylcellulose, methylhydroxyethylcellulose, hydroxypropyl cellulose or hydroxypropyl methylcellulose, especially with preferably from 20 to 25% by weight carboxymethylcellulose. Synthetic thickeners that may be mentioned are, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and preferably from 1 to 10 mPa·s.

The inks may also comprise customary additives, such as antifoam agents or especially substances that inhibit the growth of fungi and/or bacteria. Such additives are usually used in amounts of from 0.01 to 1% by weight, based on the total weight of the ink.

The inks can be prepared in customary manner by mixing the individual constituents together, for example in the desired amount of water.

The inks according to the invention are especially suitable for use in recording systems of the type in which an ink is expressed in the form of droplets from a small aperture, the droplets being directed onto a substrate on which an image is produced. Suitable substrates are, for example, textile fibre materials, paper, plastics or aluminium foils. Suitable recording systems are, for example, commercially available ink-jet printers for use in paper or textile printing, or writing implements, such as fountain pens or ballpoint pens, especially ink-jet printers.

Depending upon the nature of the use it may be necessary, for example, to adjust the viscosity or other physical properties of the ink, especially those properties which have an effect upon the affinity for the substrate in question. For printing textile fibre materials, paper or plastics films it is preferable to use aqueous inks.

Examples of paper that can be printed using the inks according to the invention include commercially available ink-jet paper, photographic paper, glossy paper and plastics-coated paper, e.g. Epson ink-jet paper, Epson photo paper, Epson glossy paper, Epson glossy film, HP special ink-jet paper, Encad photo gloss paper and Ilford photo paper. Plastics films that can be printed using the inks according to the invention are, for example, transparent or milky/opaque. Suitable plastics films are, for example, 3M transparency film. Glossy paper, e.g. Epson glossy paper, is preferred.

Textile fibre materials that come into consideration are especially nitrogen-containing or hydroxy-group-containing fibre materials, e.g. textile fibre materials of cellulose, silk, wool or synthetic polyamides.

Examples of aluminium foils are surface-treated foils, e.g. vinyl-coated aluminium foils.

The present invention accordingly also relates to a method of printing paper, textile fibre material, plastics films or aluminium foils, preferably paper, textile fibre materials and plastics films, especially paper, in accordance with the ink-jet printing method, which comprises using an ink, preferably an aqueous ink, comprising a dye of formula (1), wherein X, R, m and n have the definitions and preferred meanings given for formula (1).

In ink-jet printing, individual droplets of the ink are sprayed onto a substrate in a controlled manner from a nozzle. For this purpose, predominantly the continuous ink-jet method and the drop-on-demand method are used. In the continuous ink-jet method, the droplets are produced continuously and any droplets not required for the printing are conveyed to a collecting vessel and recycled, whereas in the drop-on-demand method droplets are produced and printed as required; that is to say droplets are produced only when required for the printing. The production of the droplets can be effected, for example, by means of a piezo-ink-jet head or by means of thermal energy (bubble jet). For the process according to the invention, printing by means of an piezo-ink-jet head is preferred. Also preferred for the process according to the invention is printing in accordance with the continuous ink-jet method.

The recordings, for example prints, obtained are distinguished especially by good lightfastness properties and a high colour brilliance.

The present invention relates also to dyes of formula (1a)

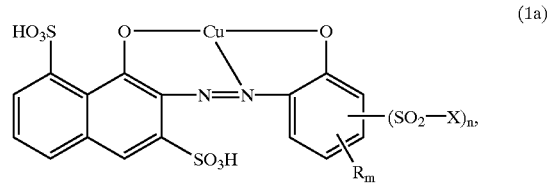

wherein

X, R, m and n have the definitions and preferred meanings given for formula (1), and dyes of formula (1b)

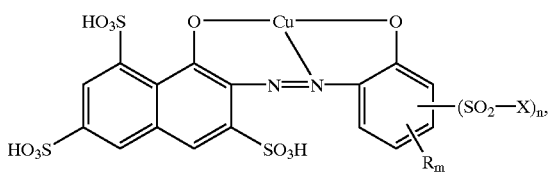

wherein
- X is hydroxy, unsubstituted or hydroxy-substituted $C_1$–$C_4$alkyl or a radical —$CH_2$—$CH_2$—Z, wherein Z is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom; or X has the same definitions as Z;
- R is $C_1$–$C_4$alkyl, $C_1$–$C_4$alkoxy or halogen; and
- m and n are each independently of the other the number 0, 1 or 2.

In respect of X, R, m and n in the dyes of formula (1b), the definitions and preferred meanings indicated under formula (1) apply in a corresponding manner.

The present invention relates also to a process for the preparation of dyes of formula (1a) or (1b), in which process a compound of formula (3)

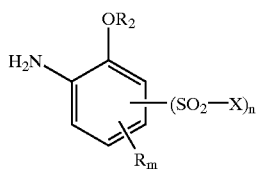

is diazotised, the resulting diazo compound is coupled to the compound of formula (4)

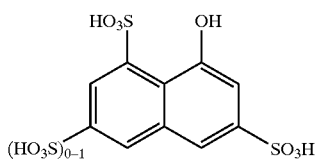

and the resulting azo dye is copper-treated with copper-yielding agents, $R_2$ being hydrogen or $C_1$–$C_4$alkyl, especially hydrogen or methyl, and in respect of R, X, m and n the definitions and preferred meanings indicated under formula (1a) or (1b) applying; or, preferably, a compound of formula (3) wherein X is vinyl or —$CH_2$—$CH_2$—Z and Z is a group removable under alkaline conditions, especially —$OSO_3H$, is diazotised, the resulting diazo compound is coupled to the compound of formula (4), the resulting azo dye is copper-treated with copper-yielding agents and the resulting copper complex azo dye is reacted as appropriate with at least an equimolar amount of a compound of formula (5)

$$Z—H \tag{5}$$

Z having the definitions and preferred meanings given above with the exception of a group removable under alkaline conditions.

The compounds of formulae (3), (4) and (5) are known or can be prepared in accordance with processes known per se.

For example, the compound of formula (3) wherein X is —$CH_2$—$CH_2$—Z and Z has the definitions and preferred meanings given above with the exception of a group removable under alkaline conditions can be prepared, for example, from the corresponding precursor of the compound of formula (3) wherein X is vinyl or —$CH_2$—$CH_2$—Z and Z is a group removable under alkaline conditions, especially —$OSO_3H$, by reaction with at least an equimolar amount of a compound of formula (5), for example under the conditions described below.

The diazotisation of the amine of formula (3) is effected in a manner known per se, for example with a nitrite, e.g. with an alkali metal nitrite, such as sodium nitrite, in a mineral-acid-containing medium, e.g. in a hydrochloric-acid-containing medium, at temperatures of, for example, from —5 to 40° C. and preferably at from 0 to 20° C.

The coupling to the coupling component of formula (4) is effected in a manner known per se, at acidic, neutral to weakly alkaline pH values, for example at a pH value of from 0 to 8, and temperatures of, for example, from −5 to 40° C., preferably from 0 to 30° C.

As copper-yielding agent there may be used salts that contain the copper as cation, e.g. copper sulfate, copper chloride or copper acetate. In some cases it will be advantageous to use complex copper compounds, for example in the form of copper-amine complexes, such as copper tetraaminesulfates of copper sulfate and ammonia, pyridine or monoethanolamine, or in the form of compounds that contain the copper bound in complex form, for example complex copper compounds of alkali metal salts of aliphatic aminocarboxylic acids or hydroxycarboxylic acids, such as of glycine, lactic acid and especially tartaric acid, such as sodium copper tartrate.

The treatment with the copper-yielding agent is carried out in a manner known per se, for example in an aqueous or organic-aqueous medium, for example at room temperature when readily metallizable starting compounds are present, or, when it is necessary for de-alkylation to take place at the same time as the metallization, by heating to temperatures of from 50 to 120° C. in an open vessel, e.g. with reflux cooling or as appropriate in a closed vessel under pressure, the pH conditions being determined by the nature of the metallization method selected; for example, acidic copper-treatment with copper sulfate, especially in the presence of an alkali metal acetate, e.g. sodium acetate, or alkaline copper-treatment with copper tetraaminesulfate.

It is advantageous to use an excess of the compound of formula (5), for example a molar excess of from 1.2 to 20, preferably from 1.5 to 10.

The reaction with the compound of formula (5) is advantageously carried out in the presence of a base, e.g. an alkali metal hydroxide, an alkali metal alcoholate or benzyltrimethylammonium hydroxide, preferably an alkali metal hydroxide, e.g. sodium hydroxide or potassium hydroxide, or an acid, e.g. sulfuric acid, glacial acetic acid or boron trifluoride, preferably a base.

Ammonia and aliphatic amines are sufficiently basic to be added under mild conditions, in some cases also without the presence of a base or acid. In the case of aromatic amines, however, relatively high temperatures, for example temperatures above 100° C., must be employed. The reaction conditions are governed especially by the nucleophilicity of the compound of formula (5). The reaction is advantageously carried out at temperatures of from 10 to 120° C., preferably from 15 to 100° C. and especially from 20 to 75° C. These dependencies are generally known and are adequately described in the literature.

The sulfo groups in the dyes according to the invention are either in the form of the free sulfonic acid or, preferably, in the form of a salt thereof, e.g. in the form of a sodium, lithium, potassium or ammonium salt or in the form of a salt of an organic amine, e.g. in the form of a triethanolammonium salt or in the form of a salt of an amine Z—H of formula (5), wherein Z is N-mono- or N,N-di-$C_1$–$C_{24}$alkylamino unsubstituted or substituted in the alkyl moiety, or uninterrupted or interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; or piperazin-1-yl or piperidin-1-yl unsubstituted or substituted at the nitrogen atom, that is suitable for the preparation of the dyes according to the invention, the definitions and preferred meanings given above for the amine radical Z applying in corresponding manner. Special mention should be made of the salts of an amine of formula

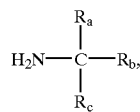

wherein the sum of the carbon atoms $R_a$+$R_b$+$R_c$ is from 11 to 14 (e.g. ®Primene 81 R, Rohm & Haas), which are suitable especially for the printing of aluminium sheets or foils.

The present invention accordingly relates also to the dyes of formula (1) wherein X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom;
or X has the same definitions as Z with the exception of a group removable under alkaline conditions;
R is $C_1$–$C_4$alkyl, $C_1$–$C_4$alkoxy or halogen; and
m and n are each independently of the other the number 0, 1 or 2; in the form of a salt of an amine of formula

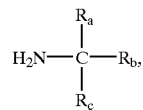

wherein the sum of the carbon atoms $R_a$+$R_b$+$R_c$ is from 11 to 14.

In respect of X, R, m and n, the definitions and preferred meanings indicated above under formula (1) apply.

The dyes according to the invention are also suitable for the dyeing and printing of hydroxy-group-containing and nitrogen-containing fibre materials, paper and aluminium sheets or aluminium foils in accordance with methods known per se, for example immersion processes, roller printing or film printing. The dyes according to the invention are also suitable for the dyeing or mordanting of wood.

Examples of fibre materials are silk, wool, synthetic polyamide fibres and polyurethanes and also cellulosic fibre materials of all kinds. Cellulosic fibre materials are, for example, the natural cellulosic fibres, such as cotton, linen and hemp, as well as cellulose and regenerated cellulose. The dyes according to the invention are also suitable for the dyeing or printing of hydroxy-group-containing fibres that are present in blend fabrics, for example mixtures of cotton with polyester fibres or polyamide fibres. The above-mentioned textile material can be in a wide variety of processing forms, e.g. in the form of fibres, yams, woven fabrics or knitted fabrics.

Examples of aluminium sheets or foils are surface-treated sheets or foils, e.g. vinyl-coated aluminium sheets or foils.

The present invention accordingly also relates to the use of the dyes according to the invention in the dyeing or printing of textile fibre materials, especially hydroxy-group-containing or nitrogen-containing fibre materials, wood, paper, aluminium sheets or aluminium foils.

The dyes according to the invention can be used for dyeing or printing in the generally customary, optionally preformulated form, for example in the form of aqueous dye solutions for the exhaust process or in the form of print pastes for use in screen printing.

The dyeings and prints obtained have good all-round properties, especially good fastness to light and a high colour brilliance. Dyeings and prints on hydroxy-group-containing or nitrogen-containing fibre materials are also distinguished by good fastness to rubbing, to wetting and to wet rubbing.

The present invention relates also to dye mixtures comprising a dye of formula (1) wherein X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom; or X has the same definitions as Z with the exception of a group removable under alkaline conditions;
R is $C_1$–$C_4$alkyl, $C_1$–$C_4$alkoxy or halogen; and m and n are each independently of the other the number 0, 1 or 2;

together with at least one dye from the group:
xanthene dyes of formula (6)

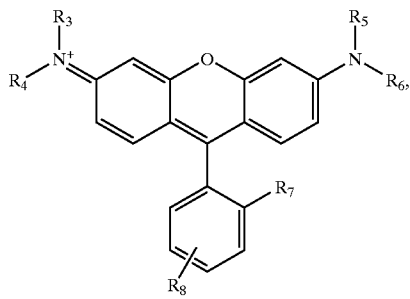

(6)

azo dyes of formulae (7) and (8)

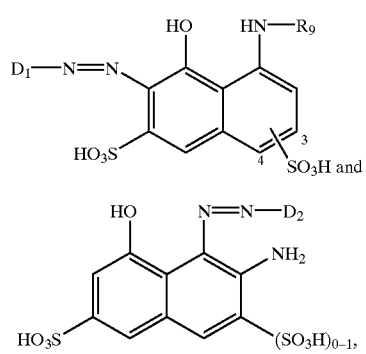

(7)

(8)

wherein $D_1$ are $D_2$ are each independently of the other the radical of a diazo component of the benzene or naphthalene series, $R_3$, $R_4$, $R_5$ are $R_6$ are each independently of the others $C_1$–$C_4$alkyl or unsubstituted or substituted $C_5$–$C_7$cycloalkyl, preferably $C_1$–$C_4$alkyl, $R_7$ are $R_8$ are each independently of the other sulfo or carboxy, and $R_9$ is hydrogen or an acyl radical, preferably an acyl radical.

The numbering on the naphthalene coupling component of the dye of formula (7) indicates the possible bonding positions of the sulfo group.

Suitable radicals of a diazo component of the benzene or naphthalene series for $D_1$ and $D_2$ are described, for example, in U.S. Pat. No. 5,750,662 (columns 2 to 6). X' in the triazinyl radical of formula (5) in column 3 of U.S. Pat. No. 5,750,662 can also be a non-reactive substituent and may have, for example, the meanings indicated in the said patent specification for V as non-reactive substituents.

There come into consideration as $C_1$–$C_4$alkyl for $R_3$, $R_4$, $R_5$ and $R_6$ each independently of the others, for example, methyl, ethyl, n- or iso-propyl and n- or iso-butyl, preferably methyl and ethyl and especially ethyl.

There comes into consideration as $C_5$–$C_7$cycloalkyl for $R_3$, $R_4$, $R_5$ are $R_6$ each independently of the others especially the cyclohexyl radical. The mentioned cycloalkyl radicals may be unsubstituted or, for example, substituted by $C_1$–$C_4$alkyl, especially by methyl.

Examples of acyl radicals for $R_9$ that come into consideration are $C_1$–$C_4$alkanoyl unsubstituted or substituted, for example by $C_1$–$C_4$alkoxy, halogen, hydroxy or by carboxy; benzoyl unsubstituted or substituted, for example by $C_1$–$C_4$alkyl, $C_1$–$C_4$alkoxy, halogen, hydroxy, sulfo or by carboxy; a triazinyl radical or a pyrimidyl radical. Suitable triazinyl radicals correspond, for example, to the radical of formula (5) in column 3 of U.S. Pat. No. 5,750,662, wherein X' nay also be a non-reactive substituent and may have, for example, the meanings given in the said patent specification for V as non-reactive substituents. Suitable pyrimidyl radicals correspond, for example, to the radical of formula (6) in column 3 of U.S. Pat. No. 5,750,662. $R_9$ is preferably a triazinyl radical or a pyrimidyl radical.

Azo dyes of formula (7) also include dyes wherein two azo chromophores are bonded to one another by way of $R_9$ as a triazinyl or pyrimidyl radical, preferably a triazinyl radical, by a bridge member, e.g. a 1,2-diaminopropyl, 1,4-phenylenediamino or 2,2'-disulfo-4,4'-diaminostilbene radical. Further suitable bridge members are described, for example, in U.S. Pat. No. 5,717,078 (columns 2 are 3).

The dyes of formulae (6), (7) and (8) are known or can be prepared in accordance with processes known per se.

The dyes of formulae (6), (7) and (8) are preferably red dyes.

Suitable dyes of formula (8) are disclosed, for example, in WO-A-99 29782, WO-A-99 31182, WO-A-96 24636 are EP-A-0 922 735.

Suitable xanthene dyes of formula (6) are, for example, the dyes of formulae (6a), (6b) and (6c)

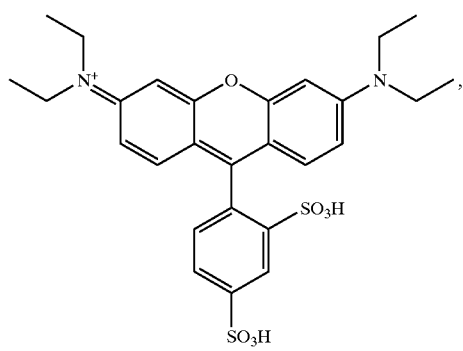

(6a)

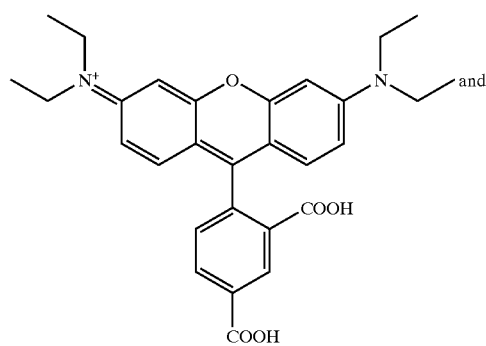

(6b)

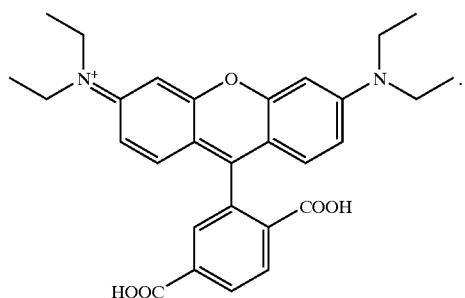
(6c)
Suitable azo dyes of formula (7) are, for example, the dyes of formula e (7a), (7b), (7c), (7d), (7e), (7f), (7g), (7h), (7i), (7j) and (7k)
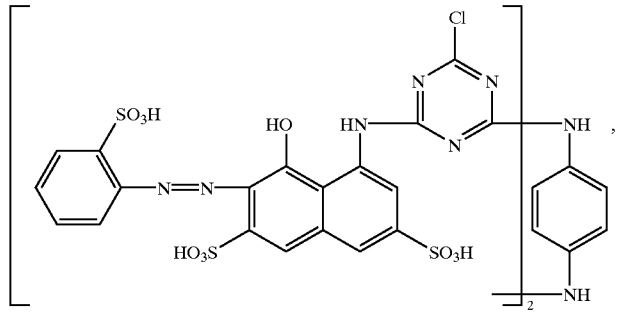
(7a)
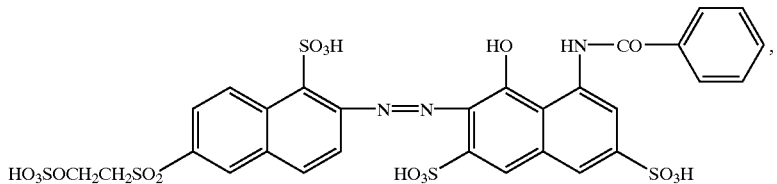
(7b)
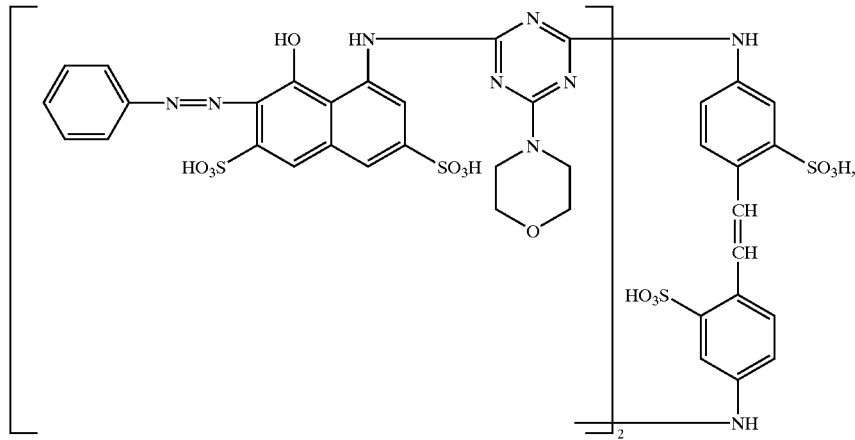
(7c)
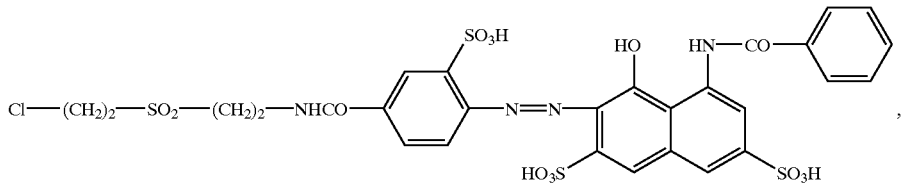
(7d)

-continued
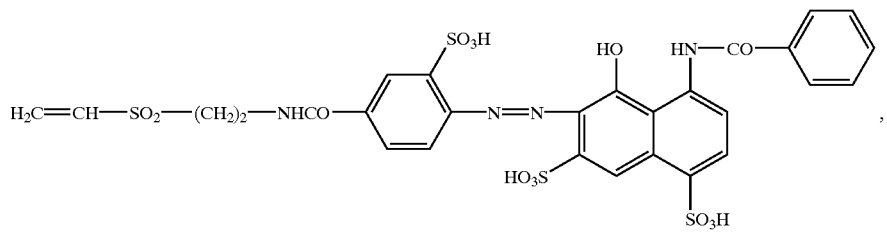
(7e)
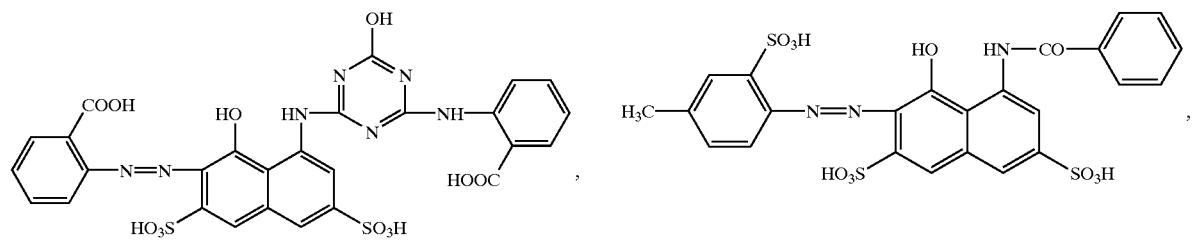
(7f) (7g)
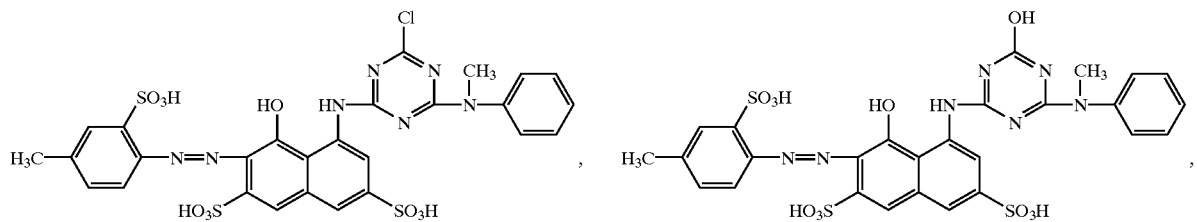
(7h) (7i)
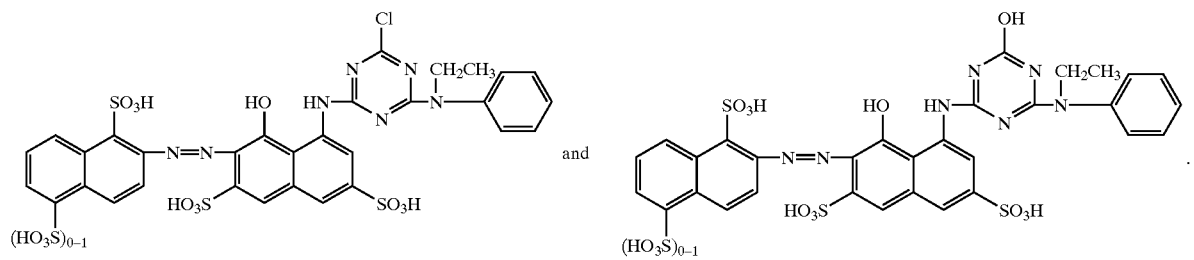
(7j) and (7k).
Suitable azo dyes of formula (8) are, for example, the dyes of formulae (8a), (8b) and (8c)
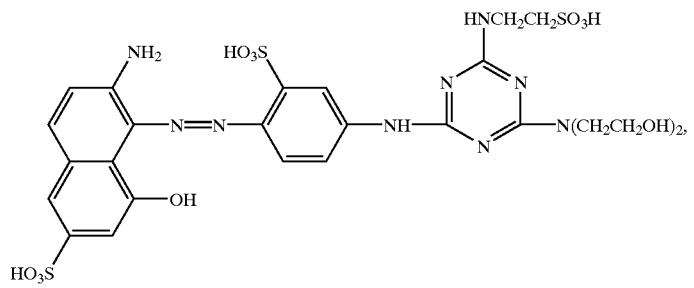
(8a)

-continued (8b)
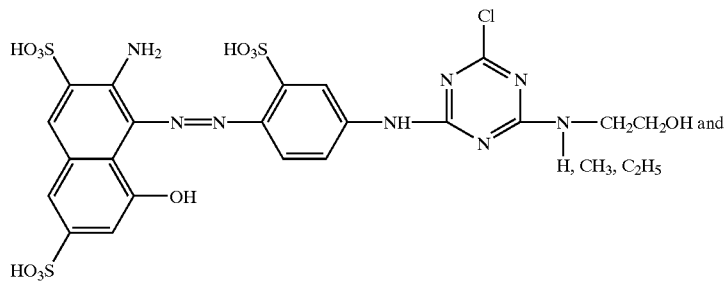

(8c)
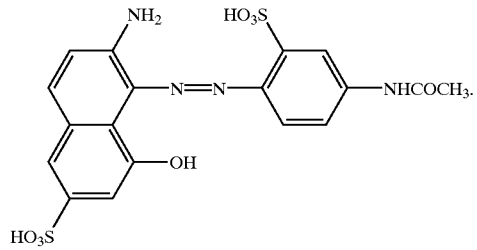

The dye of formula (1) is present in the dye mixture according to the invention, for example, in an amount of from 2 to 98% by weight, preferably from 5 to 95% by weight and especially from 10 to 90% by weight, based on the total weight of the dyes in the mixture.

The dye mixtures according to the invention can be prepared, for example, by mixing the individual dyes together. The mixing process is carried out, for example, in suitable mills, e.g. ball mills or pinned disk mills, as well as in kneaders or mixers.

The dye mixtures are suitable especially for the preparation of inks, for example aqueous inks having the compositions given above, which are used especially in recording systems, e.g. in ink-jet printers.

The dye mixtures according to the invention can therefore also be obtained directly in the form of an aqueous ink formulation by dissolving the individual dyes together in water, together with the remaining constituents, or they can be prepared by mixing together inks that already comprise the appropriate individual dyes.

The recordings, for example prints, obtained are distinguished especially by good light fastness properties and a high colour brilliance.

The following Examples serve to illustrate the invention. The temperatures are given in degrees Celsius. Unless otherwise indicated, parts are parts by weight and percentages relate to percent by weight. The relationship between parts by weight and parts by volume is the same as that between kilograms and litres.

EXAMPLE 1A a) 31 parts of an aniline derivative of formula

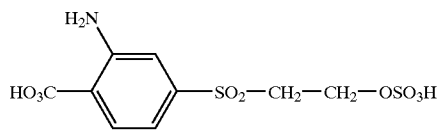

are introduced into 100 parts of ice-water and stirred thoroughly. 50 parts of a 31% naphthalenesulfonic acid solution are added to the resulting suspension and then, at from 0 to 5° C., 25 parts of a 4N sodium nitrite solution are added dropwise. The mixture is then stirred at that temperature until the reaction is complete and the nitrite excess is destroyed with sulfamic acid. The resulting acidic suspension of the diazo compound is added to a solution of 33.5 parts of 1-naphthol-3,8-disulfonic acid (ε-acid) in 200 parts of water at from 5 to 10° C., the pH value of the reaction mixture being maintained at 5 by the addition of a sodium acetate solution. To complete the reaction, the mixture is stirred at room temperature overnight. The product is salted out with 160 parts of sodium chloride, filtered and washed with a 25% brine, yielding 211.2 parts of a still moist compound which in the form of the free acid corresponds to formula

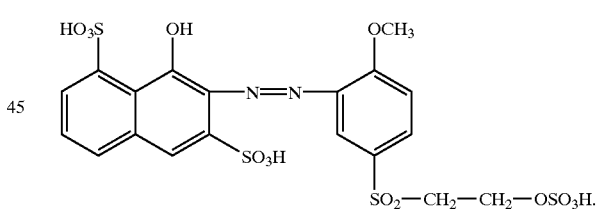

b) 30 parts of $CuSO_4 \times 5\ H_2O$ are added at room temperature to a suspension of 211.2 parts of the compound according to a) in 650 parts of water and the pH of the suspension is adjusted to 4.5 by the addition of sodium acetate. The suspension is heated to 90 to 95° C., the pH being maintained at from 3.9 to 4 by the further addition of sodium acetate. To complete the reaction, the mixture is stirred under those conditions for several hours (monitoring by means of thin-layer chromatography). The mixture is then cooled to room temperature and adjusted to pH 4 with sodium acetate. The resulting mixture is clarified by filtration, freed of salt by reverse osmosis and freeze-dried, yielding 88 parts of a dye which in the form of the free acid corresponds to formula (101)

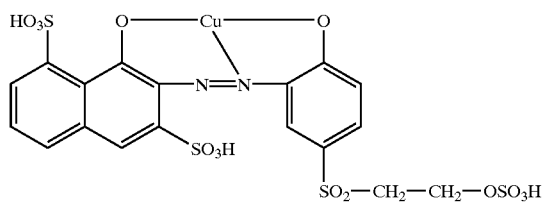

(101)

and yields prints or dyeings on cotton, wool, silk and paper in a clear magenta shade having good fastness to light and a high colour brilliance.

EXAMPLE 1B a) 21 parts of an aniline derivative of formula

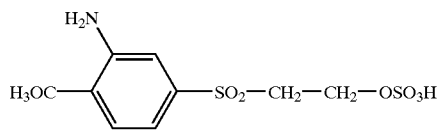

are introduced into 100 parts of ice-water and stirred thoroughly. 50 parts of a 31% naphthalenesulfonic acid solution are added to the resulting suspension and then, at from 0 to 5° C., 25 parts of a 4N sodium nitrite solution are added dropwise. The mixture is then stirred at that temperature until the reaction is complete and the nitrite excess is destroyed with sulfamic acid. The resulting acidic suspension of the diazo compound is added to a solution of 42.3 parts of 1-naphthol-3,6,8-trisulfonic acid in 250 parts of water at from 5 to 10° C., the pH value of the reaction mixture being maintained at 5 by the addition of a 4N sodium acetate solution. To complete the reaction, stirring is carried out at room temperature overnight. The resulting solution is clarified by filtration, and the product is salted out, filtered and washed, yielding 143.4 parts of a still moist compound which in the form of the free acid corresponds to formula

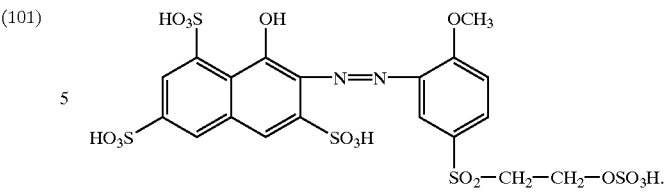

b) 30 parts of $CuSO_4 \times 5\ H_2O$ are added at room temperature to a solution of the compound obtained according to a) in 600 parts of water and the pH is adjusted to 4.5 by the addition of sodium acetate. The solution is heated to 90 to 95° C. and is stirred under those conditions for several hours to complete the reaction, then cooled to room temperature. The reaction solution is clarified by filtration, freed of salt by reverse osmosis and freeze-dried, yielding 73.7 parts of a dye which in the form of the free acid corresponds to formula (102)

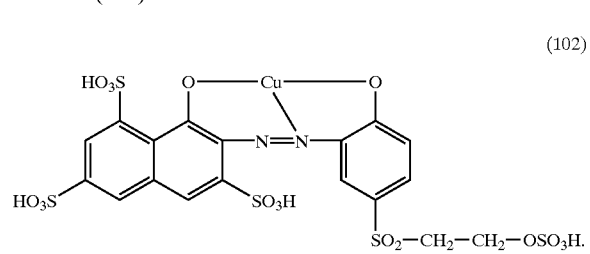

The dye, or the inks comprising the dye, yield prints and dyeings on cotton, wool, silk and paper in a magenta shade having good fastness to light and a high colour brilliance.

EXAMPLES 2 to 19

Analogously to the procedure described in Example 1A or 1B, it is possible to prepare the dyes of the formulae indicated in Table 1 by using instead of the aniline derivative according to Example 1Aa) or 1Ba) an equimolar amount of the aniline derivative on which the respective dye in Table 1 is based:

TABLE 1

| Example s = 0/s = 1 | | s = 0/s = 1 |
|---|---|---|
| 2/3 | ![structure] HO₃S, (HO₃S)ₛ, O-Cu-O, N=N, SO₃H, SO₂-CH₂-CH₂-OSO₃H | (103)/(104) |
| 4/5 | ![structure] HO₃S, (HO₃S)ₛ, O-Cu-O, N=N, SO₃H, SO₃H | (105)/(106) |

TABLE 1-continued

| Example s = 0/s = 1 | Structure | s = 0/s = 1 |
|---|---|---|
| 6/7 | Cu-complex azo dye: 1-hydroxy-8-sulfo-6-($HO_3S$)$_s$-naphthalene-3-sulfonic acid coupled via N=N to 2-hydroxy-3,5-disulfo-phenyl with additional $SO_3H$ | (107)/(108) |
| 8/9 | As above, coupler = 2-hydroxy-3-methyl-5-sulfo-phenyl ($CH_3$, $SO_3H$) | (109)/(110) |
| 10/11 | As above, coupler = 2-hydroxy-3-chloro-5-sulfo-phenyl (Cl, $SO_3H$) | (111)/(112) |
| 12/13 | As above, coupler = 2-hydroxy-5-($SO_2NH_2$)-phenyl | (113)/(114) |
| 14/15 | As above, coupler = 2-hydroxy-5-($SO_2NHCH_2CH_3$)-phenyl | (115)/(116) |
| 16/17 | As above, coupler = 2-hydroxy-5-($SO_2N(CH_3)CH_2CH_2SO_3H$)-phenyl | (117)/(118) |
| 18/19 | As above, coupler = 2-hydroxy-5-($SO_2CH_3$)-phenyl | (119)/(120) |

The dyes yield prints and dyeings on cotton, wool, silk and paper in a clear magenta shade having good fastness to light and a high colour brilliance.

EXAMPLE 20

A neutral solution of 14.8 parts of aspartic acid in 50 parts of water is added at room temperature to a solution of 7.5 parts of the dye of formula (101) according to Example 1A in 50 parts of water and the pH is adjusted to 10 with a 15% sodium hydroxide solution. To complete the reaction, stirring is carried out under those conditions for several hours (monitoring by means of thin-layer chromatography). The reaction mixture is then adjusted to pH 8 with a 16% hydrochloric acid, clarified by filtration, freed of salt by dialysis and freeze-dried, yielding 5.1 parts of a dye which in the form of the free acid corresponds to formula (121)

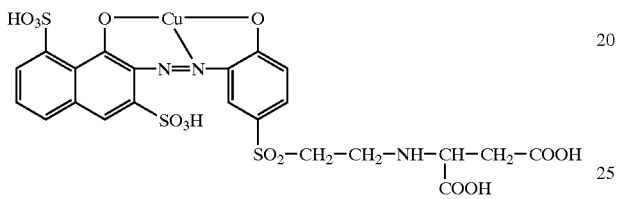

(121)

and yields prints or dyeings on cotton, wool, silk and paper in a clear magenta shade having good fastness to light and a high colour brilliance.

EXAMPLE 21

A neutral solution of 14.8 parts of aspartic acid in 50 parts of water is added at room temperature to a solution of 8.4 parts of the dye of formula (102) according to Example 1B in 50 parts of water and the pH is adjusted to 10 with a 15% sodium hydroxide solution. To complete the reaction, stirring is carried out under those conditions for several hours (monitoring by means of thin-layer chromatography). The reaction mixture is then adjusted to pH 8 with a 16% hydrochloric acid, clarified by filtration, freed of salt by dialysis and freeze-dried, yielding 6.0 parts of a dye which in the form of the free acid corresponds to formula (122)

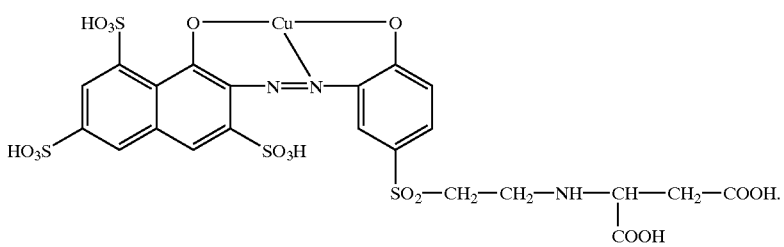

(122)

The dye, or the inks comprising the dye, yield prints and dyeings on cotton, wool, silk and paper in a magenta shade having good fastness to light and a high colour brilliance.

EXAMPLE 22

6.7 parts of the dye of formula (101) according to Example 1A are dissolved in 100 parts of water at room temperature, and 1.52 parts of N-methylglycine are added. The pH of the resulting solution is adjusted to 10 with a 15% sodium hydroxide solution and the reaction mixture is heated to 50° C. To complete the reaction, stirring is carried out under those conditions for about one hour (monitoring by means of thin-layer chromatography). The reaction mixture is then adjusted to pH 8 with a 16% hydrochloric acid, clarified by filtration, freed of salt by dialysis and freeze-dried, yielding 6.5 parts of a dye which in the form of the free acid corresponds to formula (123)

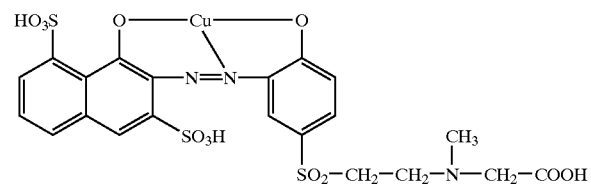

(123)

and yields prints or dyeings on cotton, wool, silk and paper in a clear magenta shade having good fastness to light and a high colour brilliance.

EXAMPLE 23

7.6 parts of the dye of formula (102) according to Example 1B are dissolved in 100 parts of water at room temperature, and 1.52 parts of N-methylglycine are added. The pH of the resulting solution is adjusted to 10 with a 15% sodium hydroxide solution and the reaction mixture is heated to 50° C. To complete the reaction, stirring is carried out under those conditions for about one hour (monitoring by means of thin-layer chromatography). The reaction mixture is then adjusted to pH 8 with a 16% hydrochloric acid, clarified by filtration, freed of salt by dialysis and freeze-dried, yielding 6.9 parts of a dye which in the form of the free acid corresponds to formula (124)

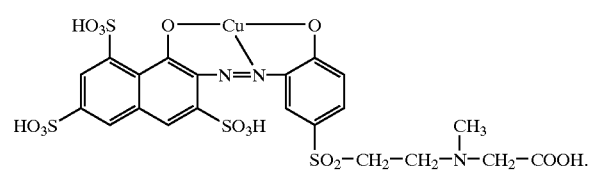

(124)

The dye, or the inks comprising the dye, yield prints and dyeings on cotton, wool, silk and paper in a magenta shade having good fastness to light and a high colour brilliance.

EXAMPLES 24 to 111

Analogously to the procedure described in Examples 20 to 23, it is possible to prepare the dyes of the general formula

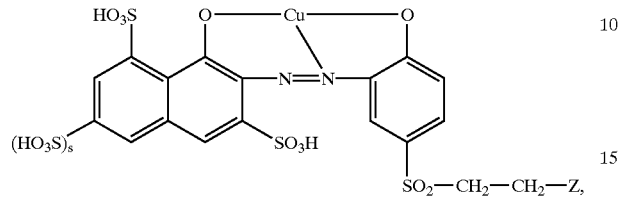

wherein s is 0 or 1 are Z has the definitions given in Table 2 by using a compound of formula Z—H instead of aspartic acid or N-methylglycine:

TABLE 2

| Example s = 0/s = 1 | Z |
|---|---|
| 24/25 | —NH$_2$ |
| 26/27 | —N(CH$_3$)$_2$ |
| 28/29 | —NH—CH$_2$—CH$_3$ |
| 30/31 | —NH—CH$_2$—CH$_2$—OH |
| 32/33 | —NH—CH$_2$—CH$_2$—O—CH$_2$—CH$_2$—OH |
| 34/35 | —N(CH$_2$—CH$_2$—OH)(CH$_2$—CH$_3$) |
| 36/37 | —N(CH$_2$—CH$_2$—OH)$_2$ |
| 38/39 | —NH—CH$_2$—CH$_2$—NH—CH$_2$—CH$_2$—OH |
| 40/41 | —NH—CH$_2$—CH$_2$—NH—CH$_2$—CH$_2$—NH$_2$ |
| 42/43 | —NH—CH$_2$—CH(CH$_3$)—NH$_2$ |
| 44/45 | —NH—CH$_2$—CH$_2$—OSO$_3$H |
| 46/47 | —NH—CH$_2$—CH$_2$—SO$_3$H |
| 48/49 | —N(CH$_3$)—CH$_2$—CH$_2$—SO$_3$H |
| 50/51 | —NH—CH$_2$—COOH |
| 52/53 | —NH—CH$_2$—CH$_2$—COOH |
| 54/55 | —NH—CH$_2$—CH$_2$—CH$_2$—COOH |
| 56/57 | —NH—CH$_2$—CH$_2$—CH$_2$—CH$_2$—CH$_2$—COOH |
| 58/59 | —NH—(CH$_2$)$_{11}$—COOH |
| 60/61 | —N(CH$_2$—COOH)$_2$ |
| 62/63 | —NH—CH(COOH)—CH$_3$ |
| 64/65 | —NH—CH(COOH)—CH$_2$—OH |
| 66/67 | —NH—CH(COOH)—CH$_2$—CH$_2$—CONH$_2$ |
| 68/69 | —NH—CH(COOH)—CH$_2$—C$_6$H$_5$ |
| 70/71 | —NH—CH(COOH)—CH$_2$—CH$_2$—COOH |
| 72/73 | —N(morpholino) |
| 74/75 | —N(piperazinyl)NH |
| 76/77 | —NH—C$_6$H$_3$(COOH)(COOH) (3,5-dicarboxyphenyl) |
| 78/79 | —NH—C$_6$H$_4$—COOH (2-carboxyphenyl) |
| 80/81 | —NH—C$_6$H$_3$(COOH)(COOH) (2,4-dicarboxyphenyl) |
| 82/83 | —NH—C$_6$H$_4$—SO$_3$H (2-sulfophenyl) |
| 84/85 | —NH—C$_6$H$_4$—SO$_3$H (4-sulfophenyl) |
| 86/87 | —NH—C$_6$H$_3$(SO$_3$H)(SO$_3$H) (2,5-disulfophenyl) |
| 88/89 | —NH—C$_6$H$_4$—CH$_2$—COOH |
| 90/91 | —NH—C$_6$H$_4$—CONH—CH$_2$—COOH |
| 92/93 | —NH—CH$_2$—C$_6$H$_4$—COOH |

TABLE 2-continued

| Example s = 0/s = 1 | Z |
|---|---|
| 94/95 | (structure: naphthalene with —NH—, SO₃H groups, HO₃S, SO₃H) |
| 96/97 | (structure: naphthalene with —NH—, SO₃H, SO₃H, SO₃H) |
| 98/99 | (structure: naphthalene with NH, SO₃H, HO₃S, SO₃H) |
| 100/101 | —S—CH₂—CH₂—COOH |
| 102/103 | —S—CH₂—COOH |
| 104/105 | —S—CH₂—CH₂—OH |
| 106/107 | —S—CH₂—CH₂—CH₂—SO₃H |
| 108/109 | —S—CH(COOH)—CH₂—COOH |
| 110/111 | —S—CH(COOH)—CH₃ |

The dyes, or the inks comprising the dyes, yield prints and dyeings on cotton, wool, silk and paper in a magenta shade having good fastness to light and a high colour brilliance.

EXAMPLE 112

A solution of 3.4 parts of the dye of formula (101) in 100 parts of water is vinylated by the addition of a 2N sodium hydroxide solution at pH 10 are a temperature of from 0 to 10° C. 27.4 parts of an aqueous 0.6 molar ®Primene 81 R solution are added dropwise to the resulting solution at from 0 to 5° C. in the course of a good hour and then the temperature is increased successively to 80° C., the pH being maintained at 10 by the addition of a 2N sodium hydroxide solution. When the reaction is complete (monitoring by means of thin-layer chromatography), the reaction mixture is first cooled to room temperature and then the mixture is cooled further to about 0° C. and the pH is adjusted to 6.5 with an aqueous hydrochloric acid (16%). The resulting precipitate is washed with ice-water and then dried in vacuo, yielding 3.6 parts of a dye which in salt form corresponds to formula (125)

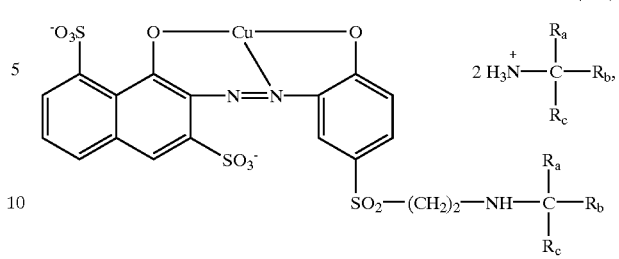

(125)

wherein the sum of the carbon atoms $R_a+R_b+R_c$ is from 11 to 14. The dye yields prints on aluminium sheet or aluminium foil in a clear magenta shade having good fastness to light and a high colour brilliance.

EXAMPLE 113

Analogously to the procedure described in Example 112, there can be obtained from the dye of formula (102) a dye which in salt form corresponds to formula (126)

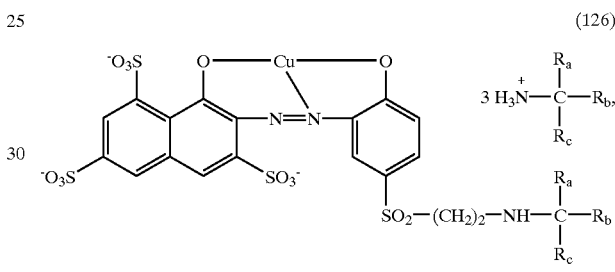

(126)

wherein the sum of the carbon atoms $R_a+R_b+R_c$ is from 11 to 14. The dye yields prints on aluminium sheet or aluminium foil in a clear magenta shade having good fastness to light and a high colour brilliance.

EXAMPLE 114

A solution of 3.4 parts of the dye of formula (101) in 100 parts of water is adjusted to pH 4.5 with a 1N sodium hydroxide solution. 27.3 parts of an aqueous 0.6 molar ®Primene 81 R solution are added dropwise to the resulting solution at from 0 to 5° C. in the course of 1.5 hours. The reaction mixture is stirred at that temperature overnight and then the liquid components are decanted off from the solid reaction mass. The residue is repeatedly washed with water, then dissolved in ethanol, concentrated by evaporation and dried in vacuo at from 40 to 50° C., yielding 3.3 parts of the dye of formula (101) in triprimene salt form

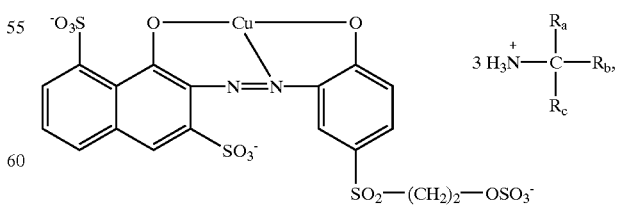

wherein the sum of the carbon atoms $R_a+R_b+R_c$ is from 11 to 14. The dye yields prints on aluminium sheet or aluminium foil in a clear magenta shade having good fastness to light and a high colour brilliance.

EXAMPLE 115

Analogously to the procedure described in Example 114, there can be obtained from the dye of formula (102) the tetraprimene salt

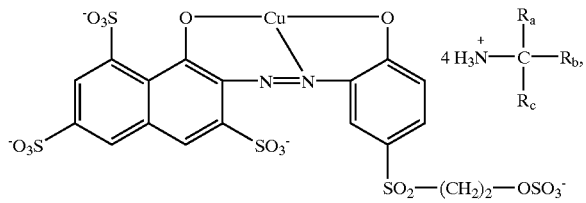

wherein the sum of the carbon atoms $R_a+R_b+R_c$ is from 11 to 14. The dye yields prints on aluminium sheet or aluminium foil in a clear magenta shade having good fastness to light and a high colour brilliance.

EXAMPLE 116

1.25 parts of the dye of formula (101) according to Example 1A and 1.6 parts of the dye of formula (6a) from the description are dissolved in 100 parts of distilled water and filtered. The ink so obtained is used to print a commercially available ink-jet paper, photographic paper or a glossy film (e.g. Epson glossy film) using a drop-on-demand ink-jet printer and yields a print in a clear magenta shade having good fastness to light and a high colour brilliance.

EXAMPLE 117

1.25 parts of the dye of formula (101) according to Example 1A and 1.6 parts of the dye of formula (7b) from the description are dissolved in 100 parts of distilled water and filtered. The ink so obtained is used to print a commercially available ink-jet paper, photographic paper or a glossy film (e.g. Epson glossy film) using a drop-on-demand ink-jet printer and yields a print in a clear magenta shade having good fastness to light and a high colour brilliance.

EXAMPLE 118

1.25 parts of the dye of formula (101) according to Example 1A and 1.6 parts of the dye of formula (8a) from the description are dissolved in 100 parts of distilled water and filtered. The ink so obtained is used to print a commercially available ink-jet paper, photographic paper or a glossy film (e.g. Epson glossy film) using a drop-on-demand ink-jet printer and yields a print in a clear magenta shade having good fastness to light and a high colour brilliance.

EXAMPLE 119

2.95 parts of the dye of formula (102) according to Example 1B are dissolved in 85 parts of distilled water, 10 parts of 1,2-propylene glycol, 1 part of glycerol and 1 part of N-methylpyrrolidone and filtered. The ink so obtained is used to print a commercially available ink-jet paper, photographic paper or a glossy film (e.g. Epson glossy film) using a drop-on-demand ink-jet printer.

EXAMPLE 120

1.40 parts of the dye of formula (102) according to Example 1B and 1.6 parts of the dye of formula (6a) from the description are dissolved in 90 parts of distilled water and 10 parts of 1,2-propylene glycol and filtered. The ink so obtained is used to print a commercially available ink-jet paper, photographic paper or a glossy film (e.g. Epson glossy film) using a drop-on-demand ink-jet printer.

EXAMPLE 121

1.40 parts of the dye of formula (102) according to Example 1B and 1.6 parts of the dye of formula (7b) from the description are dissolved in 90 parts of distilled water and 10 parts of 1,2-propylene glycol and filtered. The ink so obtained is used to print a commercially available ink-jet paper, photographic paper or a glossy film (e.g. Epson glossy film) using a drop-on-demand ink-jet printer.

EXAMPLE 122

1.40 parts of the dye of formula (102) according to Example 1B and 1.6 parts of the dye of formula (8a) from the description are dissolved in 90 parts of distilled water and 10 parts of 1,2-propylene glycol and filtered. The ink so obtained is used to print a commercially available ink-jet paper, photographic paper or a glossy film (e.g. Epson glossy film) using a drop-on-demand ink-jet printer.

APPLICATION EXAMPLE 1

2.85 parts of the dye according to Example 1A are dissolved in 100 parts of distilled water and filtered. The ink so obtained is used to print a commercially available ink-jet paper, photographic paper or a glossy film (e.g. Epson glossy film) using a drop-on-demand ink-jet printer.

APPLICATION EXAMPLE 2 a) A silk fabric is pad-dyed with an aqueous liquor comprising 150 g/l of a commercially available alginate thickener, 50 g/l of urea and 50 g/l of an aqueous ammonium tartrate solution (25% strength) (liquor pick-up 90%) and dried.

b) The silk fabric pretreated in accordance with a) is printed with an ink containing 5% by weight of the dye according to Example 1A or 1B, 20% by weight of 1,2-propylene glycol and 75% by weight of water using a drop-on-demand piezo ink-jet head. The print is dried and fixed at 102° C. in saturated steam and then washed off.

APPLICATION EXAMPLE 3 a) Mercerised cotton satin is pad-dyed with a liquor comprising 30 g/l of sodium carbonate (liquor pick-up 70%) and dried.

b) The cotton satin pretreated in accordance with Step a) is printed with an ink having a viscosity of 2 mPa·s, containing 15% by weight of the dye according to Example 1A or 1B, 15% by weight of 1,2-propylene glycol, 0.5% by weight of borax and 69.5% by weight of water using a drop-on-demand ink-jet head (bubble jet). The print is dried completely and fixed for 4 minutes at 102° C. in saturated steam, cold-rinsed, washed off at boiling, rinsed again and dried.

APPLICATION EXAMPLE 4 a) A printing ink is prepared from:

8% by weight of the dye according to Example 112 or 113,

8% by weight of nitrocellulose A 400,

6% by weight of ketone resin SK,

1% by weight of dibutyl phthalate,

20% by weight of 1-methoxypropanol,

20% by weight of methyl isobutyl ketone and

37% by weight of ethanol (abs.), by mixing the solvents together, then dissolving the resins and finally the dye therein. The printing ink is used to screen-print vinyl-coated aluminium sheet or aluminium foil.

APPLICATION EXAMPLE 5

10 parts of woollen knitting yarn are stirred at 30° C. into a dyebath that contains, per 100 parts of water, 0.8 part of the dye according to Example 1A or 5, 0.5 part of sodium sulfate and 2 parts of sodium acetate, and the pH value is adjusted to 4.5 with acetic acid (80%). The liquor is brought to the boil over the course of 45 minutes and maintained at boiling temperature for a further 45 to 70 minutes. The dyed material is then removed, rinsed thoroughly with cold water and dried.

APPLICATION EXAMPLE 6

2 parts of the dye according to Example 1A are dissolved in 400 parts of water; 1500 parts of a solution containing 51 g of sodium chloride per litre are then added. 100 parts of cotton fabric are then placed in the dyebath at 60° C. After 45 minutes at 60° C., 100 parts of a solution containing 16 g of sodium hydroxide and 20 g of calcined soda per litre are added. Dyeing is continued at that temperature for a further 45 minutes. The dyed goods are then rinsed, soaped at the boil with a non-ionic washing agent for a quarter of an hour, rinsed again and dried.

APPLICATION EXAMPLE 7

While stirring rapidly, 3 parts of the dye obtained according to Example 1A are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, if desired soaped at the boil and again rinsed, and then dried.

What is claimed is:

1. An ink comprising
a dye of formula (1)

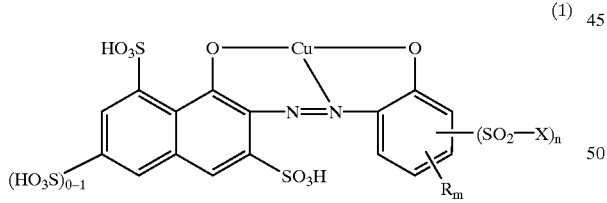

(1)

wherein
X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom;

or X has the same definitions as Z with the exception of a group removable under alkaline conditions;

R is $C_1$–$C_4$alkyl, $C_1$–$C_4$alkoxy or halogen; and m and n are each independently of the other the number 0, 1 or 2; and an organic solvent.

2. An ink according to claim 1, wherein
R is $C_1$–$C_4$alkyl or halogen.

3. An ink according to claim 1, wherein
Z is —$OSO_3H$; —Cl; $C_1$–$C_{12}$alkoxy unsubstituted or substituted in the alkyl moiety by hydroxy, sulfo or by carboxy, which may further be interrupted in the alkyl moiety by one, two or three oxygen atoms; $C_1$–$C_4$alkylthio unsubstituted or substituted in the alkyl moiety by hydroxy, sulfo or by carboxy; amino; N-mono- or N,N-di-$C_1$–$C_{14}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which may further be interrupted in the alkyl moiety by one, two or three oxygen atoms or —$NR_1$— groups in which $R_1$ is hydrogen or unsubstituted or amino-substituted $C_1$–$C_4$alkyl; $C_{20}$diterpeneamino; $C_5$–$C_7$cycloalkylamino unsubstituted or substituted by $C_1$–$C_4$alkyl or by carboxy; phenylamino or N—$C_1$–$C_4$alkyl-N-phenylamino unsubstituted or substituted by carboxymethyl, $C_1$–$C_4$alkoxy, carboxy, carbamoyl, N—$C_1$–$C_4$alkylcarbamoyl (which may itself be further substituted in the alkyl moiety by carboxy), sulfo or by halogen; naphthylamino substituted in the aryl moiety by sulfo; morpholino; piperidin-1-yl; or piperazin-1-yl unsubstituted or substituted at the nitrogen atom by 2-aminoethyl or 3-aminopropyl.

4. An ink according to claim 1, wherein
Z is —$OSO_3H$; $C_1$–$C_4$alkylthio unsubstituted or substituted in the alkyl moiety by hydroxy, sulfo or by carboxy; amino; N-mono- or N,N-di-$C_1$–$C_{14}$alkylamino unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl, which may further be interrupted in the alkyl moiety by one, two or three oxygen atoms or —NH— groups; $C_{20}$diterpeneamino; phenylamino or N—$C_1$–$C_4$alkyl-N-phenylamino unsubstituted or substituted by carboxymethyl, $C_1$–$C_4$alkoxy, carboxy, carbamoyl, N—$C_1$–$C_4$alkylcarbamoyl (which may itself be further substituted in the alkyl moiety by carboxy), sulfo or by halogen; naphthylamino substituted in the aryl moiety by sulfo; morpholino; piperidin-1-yl; or piperazin-1-yl unsubstituted or substituted at the nitrogen atom by 2-aminoethyl.

5. An ink according to claim 1, wherein
Z is —$OSO_3H$; $C_1$–$C_4$alkylthio unsubstituted or substituted in the alkyl moiety by hydroxy, sulfo or by carboxy; amino; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl.

6. An ink according to claim 1, wherein

X is hydroxy or a radical —$CH_2$—$CH_2$—Z, wherein Z is —$OSO_3H$; $C_1$–$C_4$alkylthio unsubstituted or substituted in the alkyl moiety by hydroxy, sulfo or by carboxy; amino; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl, which may further be interrupted in the alkyl moiety by one or two oxygen atoms or —NH— groups; N,N-di-$C_1$–$C_6$alkylamino unsubstituted or substituted in the alkyl moiety by amino, hydroxy, sulfo, sulfato, carboxy or by carbamoyl; morpholino; or piperazin-1-yl unsubstituted or substituted at the nitrogen atom by 2-aminoethyl;

or X is amino; N-mono-$C_1$–$C_4$alkylamino unsubstituted or substituted in the alkyl moiety by phenyl (which may itself be substituted by carboxy), hydroxy, sulfo, sulfato or by carboxy; N,N-di-$C_1$–$C_4$alkylamino unsubstituted or substituted in the alkyl moiety by hydroxy, sulfo or by carboxy; morpholino; or piperazin-1-yl unsubstituted or substituted at the nitrogen atom by 2-aminoethyl.

7. An ink according to claim 1, wherein m is the number 0 or 1 are n is the number 1 or 2.

8. An ink according to claim 1, wherein the dye of formula (1) is a dye of formula (2).

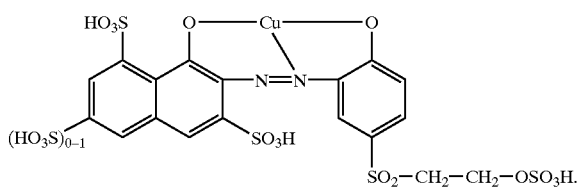

(2)

9. A method of printing paper, textile fibre materials, plastics films or aluminium foils in accordance with the ink-jet printing method, which comprises printing with an ink according to claim 1, wherein individual droplets of the ink are sprayed onto a substrate in a controlled manner from a nozzle by means of the continuous ink-jet method or the drop-on-demand method.

10. A dye of formula (1a)

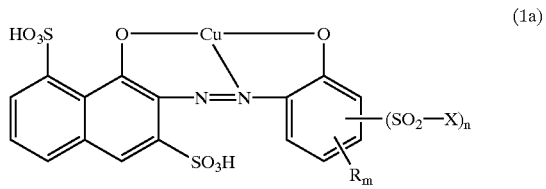

(1a)

wherein

X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthylamino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom;

or X has the same definitions as Z with the exception of a group removable under alkaline conditions;

R is $C_1$–$C_4$alkyl, $C_1$–$C_4$alkoxy or halogen; and m and n are each independently of the other the number 0, 1 or 2.

11. A dye of formula (1b)

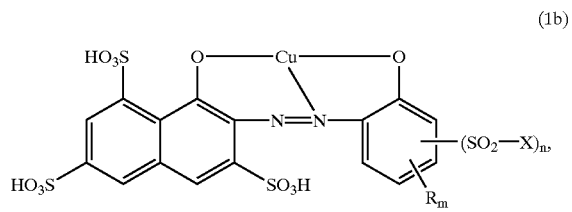

(1b)

wherein

X is hydroxy, unsubstituted or hydroxy-substituted $C_1$–$C_4$alkyl or a radical —$CH_2$—$CH_2$—Z, wherein Z is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl;

$C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom; or X has the same definitions as Z;

R is $C_1$–$C_4$alkyl, $C_1$–$C_4$alkoxy or halogen; and m and n are each independently of the other the number 0, 1 or 2.

12. A process for the preparation of a dye as defined in claim 10, in which process a compound of formula (3)

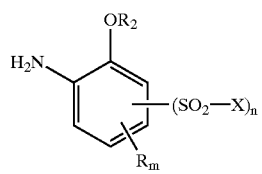
(3)

is diazotised, the resulting diazo compound is coupled to the compound of formula (4a)

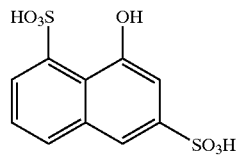
(4a)

and the resulting azo dye is copper-treated with copper-yielding agents, $R_2$ being hydrogen or $C_1$–$C_4$alkyl, and in respect of R, X, m and n the definitions indicated in claim 10 applying; or a compound of formula (3) wherein X is vinyl or —$CH_2$—$CH_2$—Z and Z is a group removable under alkaline conditions is diazotised, the resulting diazo compound is coupled to the compound of formula (4a), the resulting azo dye is copper-treated with copper-yielding agents and the resulting copper complex azo dye is reacted as appropriate with at least an equimotar amount of a compound of formula (5)

$$Z\text{—}H \quad (5),$$

wherein Z is as defined in claim 10 with the exception of a group removable under alkaline conditions.

13. A process for the preparation of a dye as defined in claim 11, in which process a compound of formula (3)

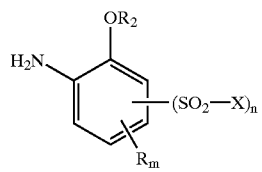
(3)

is diazotised, the resulting diazo compound is coupled to the formula (4b)

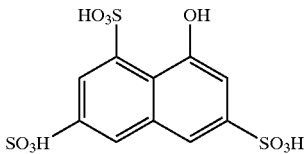
(4b)

and the resulting azo dye is copper-treated with copper-yielding agents, $R_2$ being hydrogen or $C_1$–$C_4$alkyl, and in respect of R, X, m and n the definitions indicated in claim 11 applying; or a compound of formula (3) wherein X is vinyl or —$CH_2$—$CH_2$—Z and Z is a group removable under alkaline conditions is diazotised, the resulting diazo compound is couple to the compound of formula (4b), the resulting azo dye is copper-treated with copper-yielding agents and the resulting copper complex azo dye is reacted with at least an equimolar amount of a compound of formula (5)

$$Z\text{—}H \quad (5)$$

Z being as defined in claim 11.

14. A process for dyeing or printing textile fibre materials, wood, paper, aluminium sheets or aluminium foils, which comprises applying to said material a dye according to claim 10.

15. A process for dyeing or printing textile fibre materials, wood, paper, aluminium sheets or aluminium foils, which comprises applying to said material a dye according to claim 11.

16. A dye mixture comprising a dye of formula (1)

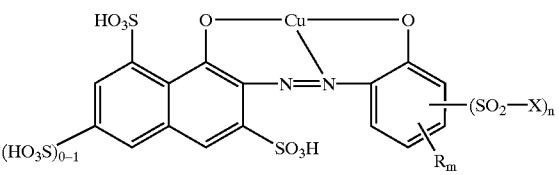
(1)

wherein

X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom; or X has the same definitions as Z with the exception of a group removable under alkaline conditions;

R is $C_1$–$C_4$alkyl, $C_1$–$C_4$alkoxy or halogen; and m and n are each independently of the other the number 0, 1 or 2;

together with at least one dye selected from the group consisting of:

xanthene dyes of formula (6)

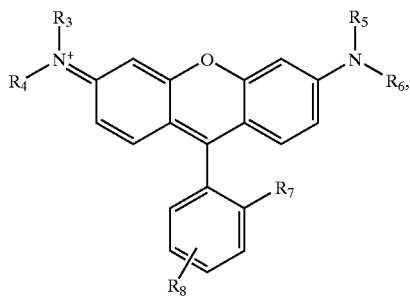

(6)

azo dyes of formula (7)

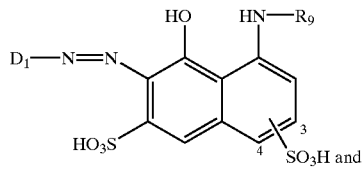

(7)

azo dyes of formula (8)

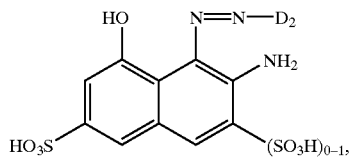

(8)

wherein $D_1$ are $D_2$ are each independently of the other the radical of a diazo component of the benzene or naphthalene series, $R_3$, $R_4$, $R_5$ are $R_6$ are each independently of the others $C_1$–$C_4$alkyl or unsubstituted or substituted $C_5$–$C_7$cycloalkyl, $R_7$ are $R_8$ are each independently of the other sulfo or carboxy, and $R_9$ is hydrogen or an acyl radical.

17. A dye of formula (1)

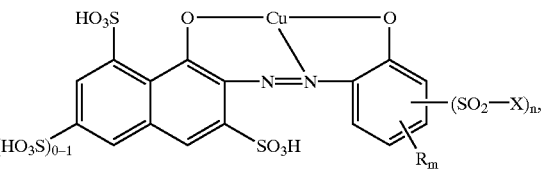

(1)

wherein

X is hydroxy, unsubstituted or hydroxy-substituted $C_1$–$C_4$alkyl, vinyl or a radical —$CH_2$—$CH_2$—Z, wherein Z is a group removable under alkaline conditions or is $C_1$–$C_{24}$alkoxy unsubstituted or substituted in the alkyl moiety, which may further be interrupted in alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino unsubstituted or substituted in the alkyl moiety, which may further be interrupted in the alkyl moiety by oxygen or by a radical —$NR_1$— in which $R_1$ is hydrogen or unsubstituted or further substituted $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino unsubstituted or substituted in the aryl moiety; morpholino; piperidin-1-yl; or piperazin-1-yl unsubstituted or substituted at the nitrogen atom;

or X has the same definitions as Z with the exception of a group removable under alkaline conditions;

R is $C_1$–$C_4$alkyl, $C_1$–$C_4$alkoxy or halogen; and m and n are each independently of the other the number 0, 1 or 2;

in the form of a salt of an amine of formula

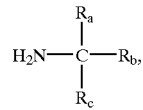

wherein the sum of the carbon atoms $R_a+R_b+R_c$ is from 11 to 14.

* * * * *